United States Patent
Strom et al.

(10) Patent No.: US 9,551,601 B2
(45) Date of Patent: Jan. 24, 2017

(54) VARIABLE LINE SIZE AVERAGING PITOT TUBE

(71) Applicant: Dieterich Standard, Inc., Boulder, CO (US)

(72) Inventors: Gregory Robert Strom, Boulder, CO (US); Paul Timothy Deegan, Denver, CO (US); David Russell Mesnard, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 113 days.

(21) Appl. No.: 14/585,423

(22) Filed: Dec. 30, 2014

(65) Prior Publication Data

US 2016/0187170 A1 Jun. 30, 2016

(51) Int. Cl.
*G01F 15/18* (2006.01)
*G01F 1/46* (2006.01)
*G01F 15/06* (2006.01)

(52) U.S. Cl.
CPC .............. *G01F 1/46* (2013.01); *G01F 15/18* (2013.01); *G01F 15/185* (2013.01); *G01F 15/063* (2013.01)

(58) Field of Classification Search
None
See application file for complete search history.

(56) References Cited

U.S. PATENT DOCUMENTS

| 3,581,565 | A | * | 6/1971 | Dieterich | ................. | G01P 5/16 |
| | | | | | | 73/861.66 |
| 3,751,982 | A | | 8/1973 | Lambert | | |
| 4,197,740 | A | | 4/1980 | McNabney | | |
| 4,444,060 | A | | 4/1984 | Yamamoto | | |

(Continued)

FOREIGN PATENT DOCUMENTS

| CN | 204007734 U | 12/2014 |
| DE | 35 27 425 | 2/1987 |
| DE | 42 07 043 | 9/1993 |

OTHER PUBLICATIONS

Product Data Sheet 00813-0100-4028, Rev. CA, "Rosemount 285 Annubar Primary Element" 2008-2009, pp. 1-12.

(Continued)

*Primary Examiner* — Harshad R Patel
(74) *Attorney, Agent, or Firm* — Westman, Champlin & Koehler, P.A.

(57) ABSTRACT

Systems, apparatus and methods are disclosed for coupling an averaging picot tube (APT) primary element to a process pipe. A mounting assembly mounts the APT primary element to the process pipe such that a length of the APT primary element extending into the process pipe is adjustable to accommodate different sized process pipe diameters. The mounting assembly includes a weld coupling coupled to the process pipe over an opening in the process pipe and having the APT primary element extending therethrough into the process pipe. An extension pipe nipple is connected to the weld coupling and has the APT primary element (Continued)

extending therethrough such that a transition between a neck section and a sensor section of the APT primary element is positioned inside the extension pipe nipple. A union component, a ferrule, and a cap keep the APT primary element in the mounted position and form a process seal.

20 Claims, 5 Drawing Sheets

(56) References Cited

U.S. PATENT DOCUMENTS

| | | | |
|---|---|---|---|
| 4,516,425 A | | 5/1985 | Chollet et al. |
| 4,624,146 A | | 11/1986 | Nakagawa |
| 4,645,242 A | * | 2/1987 | Coleman ............... F16L 41/082 285/141.1 |
| 4,677,858 A | * | 7/1987 | Ohnhaus ................ G01P 5/165 73/861.65 |
| 4,717,159 A | * | 1/1988 | Alston .................. G01F 15/185 277/314 |
| 4,823,615 A | | 4/1989 | Taha |
| 5,036,711 A | * | 8/1991 | Good .................. G01L 19/0015 73/861.66 |
| 5,185,996 A | * | 2/1993 | Smith .................. F01D 17/085 374/144 |
| 5,440,217 A | * | 8/1995 | Traina .................... G01F 1/002 318/51 |
| 5,730,652 A | | 3/1998 | Van Becelaere |
| 5,969,266 A | | 10/1999 | Mahoney et al. |
| 6,044,716 A | | 4/2000 | Yamamoto |
| 6,149,515 A | | 11/2000 | Van Becelaere |
| 6,321,166 B1 | | 11/2001 | Evans |
| 7,561,056 B2 | * | 7/2009 | McMillan ................. G01F 1/46 340/603 |
| 8,960,018 B2 | * | 2/2015 | Stehle ....................... G01F 1/46 73/861.66 |
| 2006/0230825 A1 | | 10/2006 | Gryc |
| 2010/0043567 A1 | * | 2/2010 | Rombach ................. G01F 1/46 73/861.65 |
| 2011/0146405 A1 | * | 6/2011 | Orleskie .................. G01F 1/34 73/579 |
| 2013/0327157 A1 | * | 12/2013 | Verhaagen ............. F16L 23/02 73/861.61 |
| 2014/0000384 A1 | * | 1/2014 | Reynolds ................. G01F 1/46 73/861.65 |
| 2014/0260658 A1 | * | 9/2014 | Strom .................. G01F 1/3218 73/861.01 |
| 2014/0260671 A1 | * | 9/2014 | Stehle ....................... G01F 1/46 73/861.66 |
| 2015/0075293 A1 | | 3/2015 | Fieser et al. |

OTHER PUBLICATIONS

Notification of Transmittal of the International Search Report and the Written Opinion of the International Searching Authority from PCT/US2015/013025, dated Jun. 9, 2015.
Office Action from U.S. Appl. No. 14/227,510, dated Jan. 20, 2016.
Notification of Transmittal of the International Search Report and the Written Opinion of the International Searching Authority from PCT/US2015/065741, dated May 3, 2016.

* cited by examiner

VARIABLE LINE SIZE AVERAGING PITOT TUBE

BACKGROUND

The present disclosure relates to industrial process control or monitoring systems. More specifically, the present disclosure relates to process variable transmitters of the type which use averaging pitot tube (APT) probes to measure a process variable of an industrial process.

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment. Such devices sense process variables such as process fluid flow, process fluid temperature, process fluid pressure, process fluid conductivity, process fluid pH and other process variables. Other types of industrial process field devices include valves, actuators, field controllers, data displays and communication equipment such as industrial field network bridges.

One type of process variable sensor is a flow meter that can measure a rate of fluid flow, for example. One type of flow meter, which employs an averaging pitot tube (APT) primary element, is a popular device for flow measurement because of its ability to be inserted into and retracted from a flow line, its low pressure loss, and reliable performance. The APT primary element senses and averages pressures from multiple locations across a pipeline through which a process fluid is traveling. This average pressure is then used in conjunction with flow theory and experimentally determined quantities to provide a flow measurement for the fluid. One type of APT primary element is the Annubar® APT available from Emerson Process Management. For at least Annubar® type APT primary elements, it is required that the APT primary element span the process pipeline such that multiple samples across a section of the pipeline can be averaged to account for variations in flow across the section.

Because of different customer needs, installation requirements, etc., manufacturers of APT primary elements often have to customize the APT primary elements for their customers. The custom nature of some APT primary element manufacturing results in increased costs. Many APT primary elements are built to order using customer supplied pipe internal diameter and wall thickness dimensions. These dimensions are used to determine the optimal hole and slot pattern on the upstream and downstream faces of the APT primary element. Custom manufacturing provides products which deliver high accuracy measurement but also extends the lead time for APT primary elements on both the order entry and delivery ends of the supply chain.

For some customized APT primary elements, product manufacturing only begins once unit-specific information is received and communicated through the value chain. Customers may struggle to obtain the internal pipe wall thickness and diameter dimensions needed for primary element manufacturing when specifying a flow measurement device because they do not cut a hole in the pipe until it is time to install the flow measurement device. This leads to the common practice of the customer supplying nominal pipe size and dimensions at the time of order entry. Nominal dimensions are typically defined in industry standards, for example in the ASME B36 standards, and possess a degree of uncertainty. Since the customers cannot provide measured values, additional uncertainty, up to several percent in small line sizes, can be introduced to the flow measurement.

The discussion above is merely provided for general background information and is not intended to be used as an aid in determining the scope of the claimed subject matter.

SUMMARY

Systems, apparatus and methods are disclosed for coupling an averaging pitot tube (APT) primary element to a process pipe. A mounting assembly mounts the APT primary element to the process pipe such that a length of the APT primary element extending into the process pipe is adjustable to accommodate different sized process pipe diameters. The mounting assembly includes a weld coupling coupled to the process pipe over an opening in a side of the process pipe and having the APT primary element extending therethrough into the process pipe. An extension pipe nipple is connected to the weld coupling and has the APT primary element extending therethrough such that a transition between a neck section and a sensor section of the APT primary element is positioned inside the extension pipe nipple. A union component, a ferrule, and a cap keep the APT primary element in the mounted position and form a process seal.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

It must be noted that any of the disclosed features, components, apparatus, systems and method steps can be used in any combination with other disclosed features, components, apparatus, systems and method steps. The present disclosure includes such alternate combinations even though the disclosed features, components, apparatus, systems and method steps are not illustrated or discussed in combination in the example embodiments provided.

DETAILED DESCRIPTION OF ILLUSTRATIVE EMBODIMENTS

Disclosed embodiments utilize an extended ferrule style mounting assembly to provide a variable line size averaging pitot tube primary element which can be installed in a range of pipe sizes without the need to customize the primary element for particular pipe sizes. This allows lower cost production and reduced lead time to installation in some exemplary embodiments.

Figure 1:
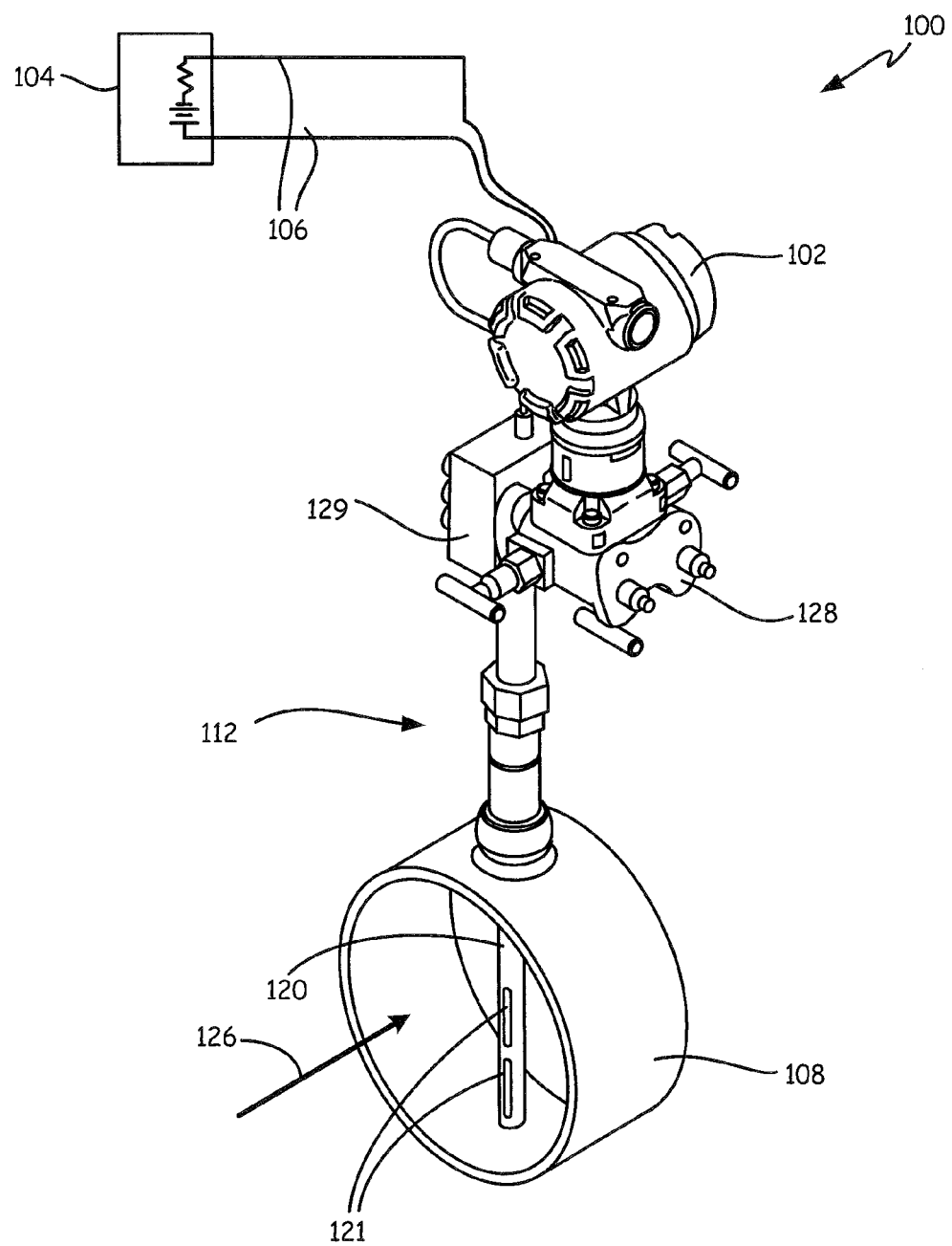
FIG. 1 is a diagrammatic illustration of an industrial process control or monitoring system for use in monitoring or controlling a process fluid in accordance with an example embodiment.

FIG. 1 is a simplified diagram showing an industrial process control or monitoring system 100 for use in monitoring or controlling a process fluid in an industrial process. Typically, a field device such as a process variable transmitter 102 is located at a remote location in a facility, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART® (IEC 62591), may also be implemented. Process control loop 106 in FIG. 1 represents either or both of wired and wireless embodiments of communication connections between transmitter 102 and control room 104.

Process variable transmitter 102 is connected, via an extended ferrule mounting assembly 112, one example embodiment of which is shown in FIG. 1, to an APT primary element 120 which extends into process piping 108 and is configured to measure one or several process fluid variables in the process piping 108. APT primary element 120 includes one or more slots and/or holes 121 which aid in the process variable measurement. Example process variables include flow, temperature, pressure, and differential pressure (DP). Process variable transmitter 102 includes a sensor 224 and other components/circuitry (shown in FIG. 2) that are configured to receive a process variable or variables from APT primary element 120 and provide a transmitter output on process control loop 106. Due to the extended ferrule mounting assembly configuration utilized in exemplary embodiments, the APT primary element need not be of a customized length or slot pattern for the particular inner diameter of process pipe 108, and can be used in process pipes having inner diameters over a range of different sizes.

In exemplary embodiments, process variable transmitter 102 is a differential pressure or multivariable transmitter. In FIG. 1, APT primary element 120 can be seen spanning the inside of process pipe 108. Generally, an APT primary element spans the entire inner diameter of process pipe 108, and the extended ferrule mounting assembly 112 allows a single length APT primary element to be used to span process pipes of different diameters, providing increased flexibility and reduced need for customization. The directional arrow 126 indicates the direction of fluid flow in pipe 108. In one example embodiment, a fluid manifold 128, a head 129, and the flow transmitter 102 are shown mounted on the exterior end of APT primary element and mounting assembly 112. Sensor 224 (shown in FIG. 2) of transmitter 102 is a pressure sensor 224 that is fluidically coupled to APT primary element 120 through passageways extending through the primary element. Components of differential pressure transmitter 102 and extended ferrule mounting assembly 112 are described below in in greater detail.

Figure 2:
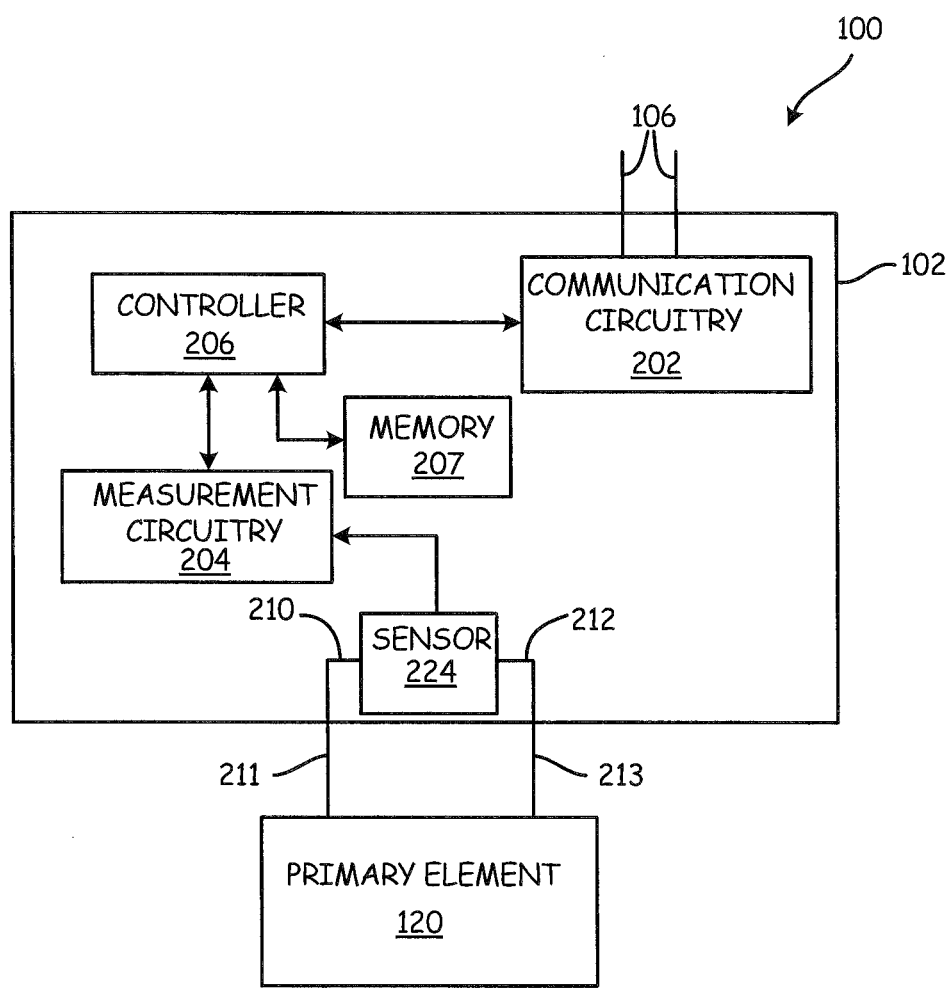
FIG. 2 is a block diagram of the system and transmitter shown in FIG. 1 in accordance with an example embodiment.

FIG. 2 illustrates components of an exemplary embodiment of process variable transmitter 102. The extended ferrule mounting assembly is omitted from FIG. 2, but is shown in greater detail in FIG. 3. As shown in the system block diagram of FIG. 2, process variable transmitter 102 includes a sensor 224 and other components/circuitry (not shown in FIG. 1) that are configured to receive a process variable from APT primary element 120 and provide a transmitter output on process control loop 106. As discussed, in exemplary embodiments, process variable transmitter 102 is a differential pressure or multivariable transmitter.

As in FIG. 1, system 100 shown in FIG. 2 is coupleable to a process control loop such as loop 106 and is adapted to communicate a process variable output, for example related to a differential pressure of fluid flow within process pipe 108. In other embodiments the process variable output is related to multiple variables such as pressure and temperature. Transmitter 102 of system 100 includes loop communication circuitry 202, pressure sensor 224, measurement circuitry 204, and controller 206.

Loop communication circuitry 202 is coupleable to the process control loop 106 and is adapted to communicate upon the process control loop. Loop communication circuitry 202 can include circuitry for communicating over a wired communication link and/or a wireless communication link Such communication can be in accordance with any appropriate process industry standard protocol such as the protocols discussed above, including both wired and wireless protocols.

In some exemplary embodiments, pressure sensor 224 includes first and second ports 210, 212 which are coupled to first and second pressure conveying conduits 211, 213 extending through primary element 120, respectively. Coupling of pressure sensor 224 to conduits 211 and 213 includes coupling through isolation diaphragms and other pressure conveying apparatus and configurations. Sensor 224 can be any device that has an electrical characteristic that changes in response to changes in applied pressure. For example, sensor 224 can be a capacitive pressure sensor the capacitance of which changes in response to the differential pressure applied between ports 210 and 212.

Measurement circuitry 204 is coupled to sensor 224 and is configured to provide a sensor output related at least to differential pressure between ports 210 and 212. Measurement circuitry 204 can be any electronic circuitry that can provide a suitable signal related to differential pressure. For example, measurement circuitry can be an analog-to-digital converter, a capacitance-to-digital converter or any other appropriate circuitry.

Controller 206 is coupled to measurement circuitry 204 and loop communication circuitry 202. Controller 206 is adapted to provide a process variable output to loop communication circuitry 202, which output is related to the sensor output provided by measurement circuitry 204. Controller 206 can be a programmable gate array device, a microprocessor, or any other appropriate device or devices. Although loop communication circuitry 202, measurement circuitry 204 and controller 206 have been described with respect to individual modules, it is contemplated that they can be combined such as on an Application Specific Integrated Circuit (ASIC). In an exemplary embodiment, memory 207 is included and is coupled to controller 206 for storage of computer readable instructions, parameter values, etc. used to configure controller 206 and/or measurement circuitry 204.

Figure 3:
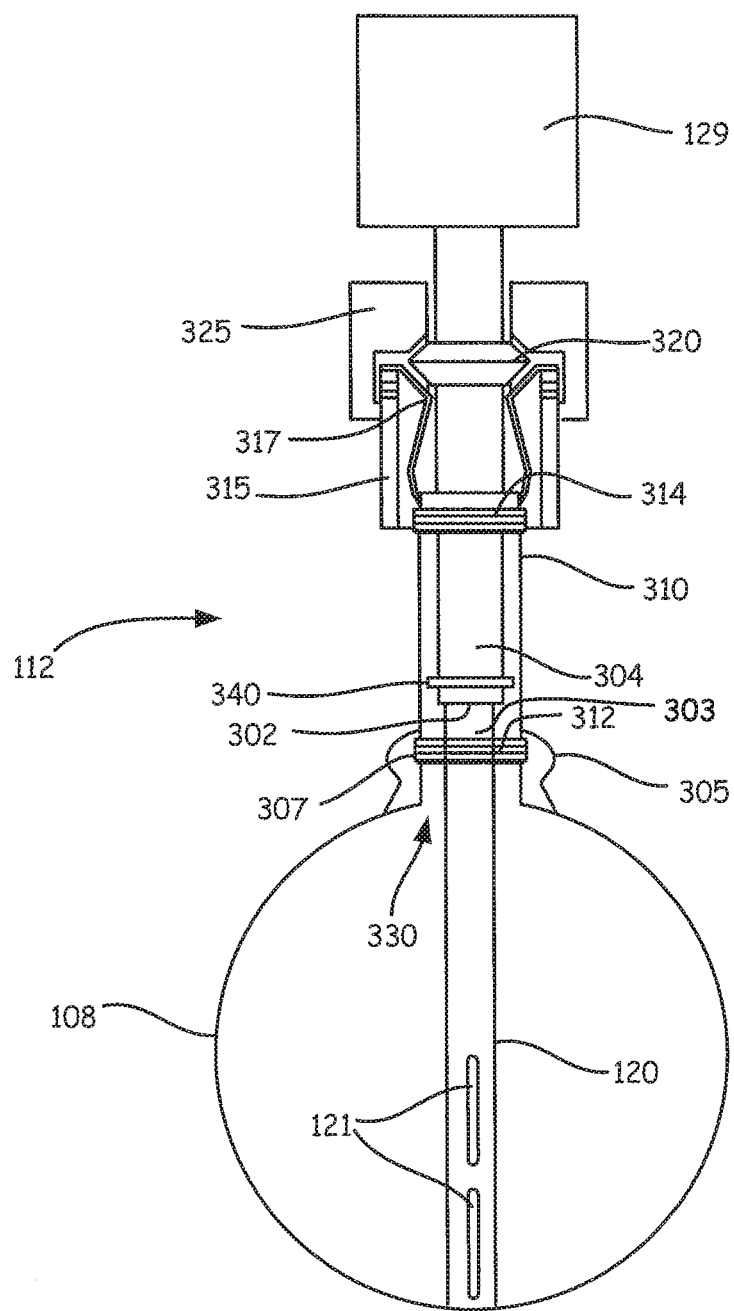
FIG. 3 is a diagrammatic side view illustration of a mounting assembly mounting an APT primary element on a process pipe in accordance with exemplary embodiments.

Referring now to FIG. 3, shown is an embodiment of a portion of process measurement system 100 illustrating APT primary element 120 and mounting assembly 112 in accordance with exemplary embodiments. Using the extended ferrule mounting assembly 112 and an APT primary element 120 having a hole and/or slot pattern which is independent of pipe size, disclosed embodiments can be used in a variety of different pipe diameters, providing potential benefits in reducing lead time for installation of system 100 as compared to conventional measurement systems and APT primary elements. As shown in FIG. 3, APT primary element 120 includes one or more slots or holes 121 positioned toward a distal end of the primary element. For different sized process pipes 108, the slots 121 span different percentages of the diameter of the process pipe In some exemplary embodiments, mounting assembly 112 includes a weld coupling 305, a threaded extension nipple 310, a threaded union component 315, a ferrule 320, and a threaded cap 325. The component closest to the customer pipe 108 is a threaded outlet fitting, or weld coupling 305, per MSS-SP97. This type of weld coupling or branch outlet fitting is a forged pipe fitting typically with a female thread that can be welded on the side of a pipe to form a branch connection. A hole is made in the pipe prior to attaching the weld coupling. In the present example, weld coupling 305 is welded to pipe 108 around an opening 330, and includes a female threaded section 307. An extended pipe nipple section 310 has first and second male threaded ends 312 and 314, with end 312 threaded into the mounting weld coupling 305. The nipple allows the primary element 120 to be installed in a range of pipe sizes by ensuring that the transition 302 between a round neck section 304 and a t-shaped sensor section 303 of APT primary element 120 is located within extended pipe nipple section 310, and thereby within a process seal, even when the device is installed in a small diameter pipe.

In this embodiments, the top or second threaded end 314 of the extended pipe nipple section 310 threads into a union component 315. The union component 315 is captured on the neck 304 of the APT primary element, along with a ferrule 320 and a threaded cap 325, by a retainer ring 340 welded to the neck 304. The union 315 has a narrow taper 317 on the internal surface which lacks clearance for the retainer ring 340. This ensures that the APT primary element 120 is not ejected from the mounting, or reduces the possibility of such happening, even if the ferrule seal were to fail. The top of the union 315 acts as a compression fitting for the ferrule when the threaded cap 325 is tightened.

Figure 4:
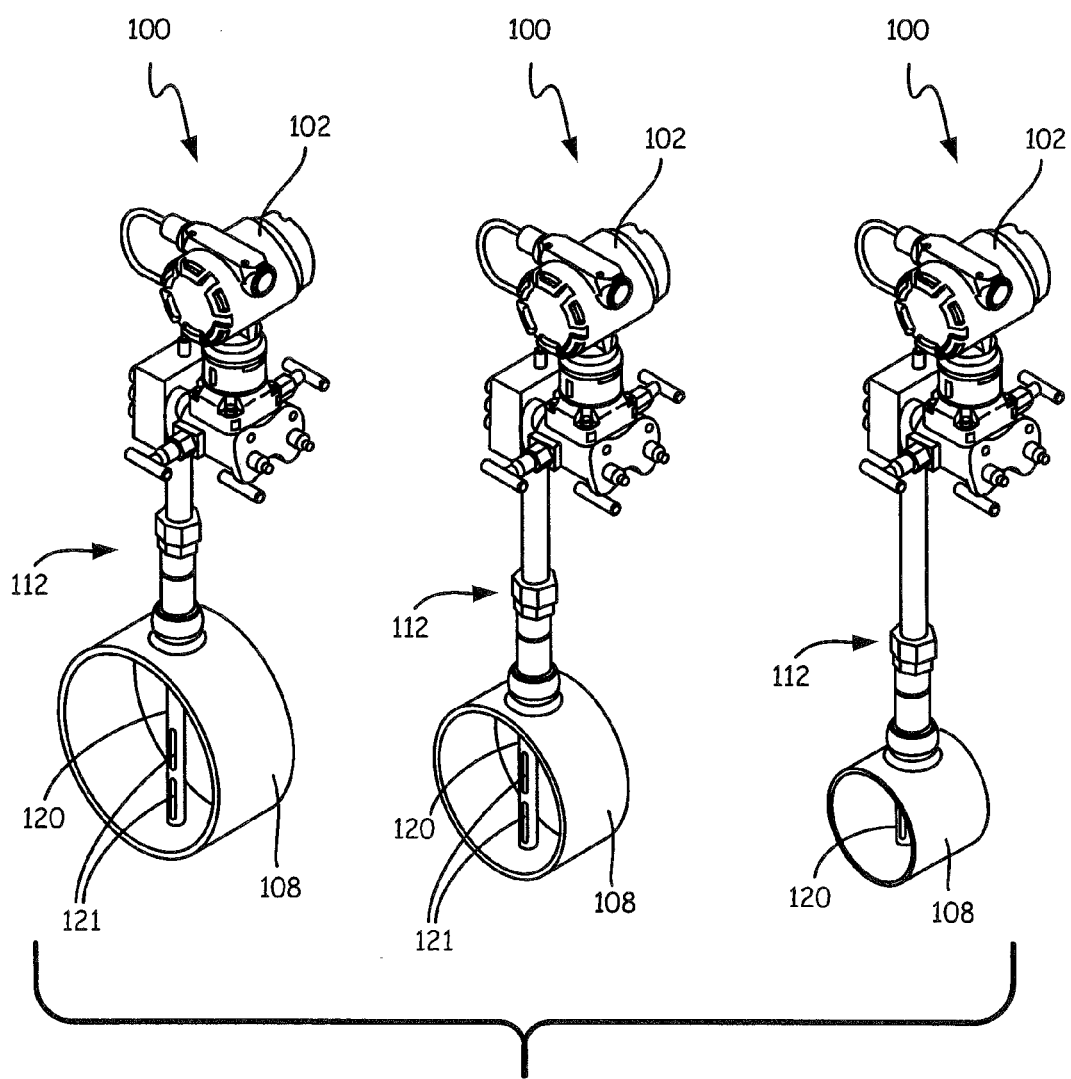
FIG. 4 illustrates the mounting assembly of FIG. 3 mounting an APT primary element to three different process pipes having differing internal diameters.
Figure 5:
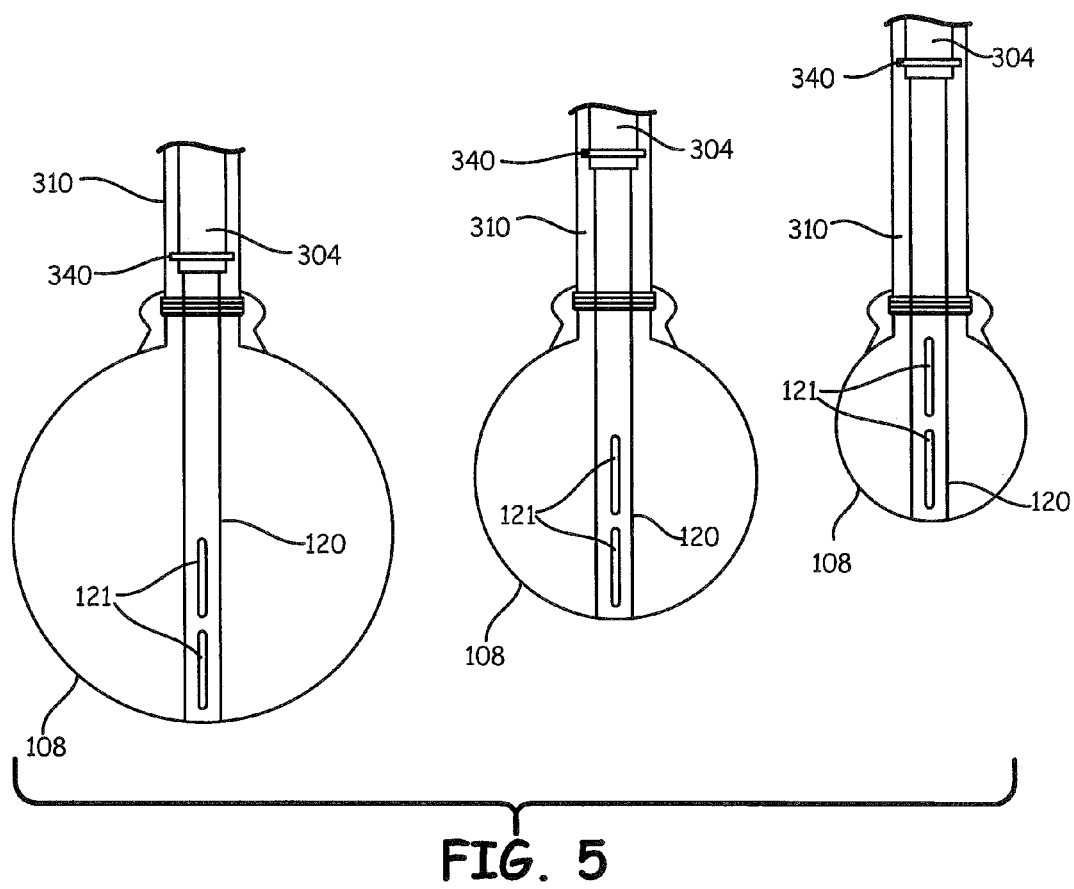
FIG. 5 illustrates a side view of the mounting assembly of FIG. 3 mounting the APT primary element to the three different process pipes shown in FIG. 4, and illustrates APT slots spanning different percentages of the three different process pipes.

During installation, the APT primary element 120 is inserted through the extended nipple section 310 and the weld coupling 305 until contact is made with the opposite side of pipe 108. Union component 315 is threaded onto threaded end 314 of extended nipple section 310 and ferrule 320 slides down the transition until the cap 325 is threaded onto the union component 315. Tightening the cap compresses the ferrule within the union component creating a ferrule seal. This sealing mechanism, in conjunction with the extended neck and mounting hardware, allows the APT primary element to be installed in a range of line or pipe sizes. For example, in an exemplary embodiment, a single primary element 120 can be used in lines or pipes 108 between 4-8″ in diameter as illustrated in FIGS. 4 and 5. As illustrated more clearly in the side views of FIG. 5, slots 121 of APT primary element 120 span larger percentages of the diameter of smaller diameter pipes 108 as compared to larger diameter pipes. The disclosed APT primary elements thus average only a portion of the flow profile when installed in larger diameter pipes, but average relatively more or all of the flow profile in smaller diameter pipes. The APT primary element and mounting assemblies of disclosed embodiments have been found to perform well in a range of pipe sizes.

While an extended ferrule mounting assembly 112 having a ferrule 320 is used to seal and retain the APT primary element in some exemplary embodiments, other types of mounting assemblies can be used with the disclosed concepts in other embodiments, depending upon the need for reusability, cost factors, etc. For example, other configurations can be used to implement the variable line or pipe size APT primary element concepts to facilitate reusability such that the a unit can be used in several installations to determine the flow, pipe size, etc.

To understand how the disclosed embodiments function, a review of a standard APT primary element function is provided. One known APT primary element, the model 485 Annubar® APT available from Emerson Process Management, includes two chambers that sense two different pressures at the primary element:

1. The upstream, or fluid velocity pressure, at the front of the sensor cylinder
2. The downstream, or cylinder base pressure, at the rear of the sensor cylinder The APT primary element measuring signal is the difference between these two pressures, and is affected by any changes in how these two pressures are generated. For the upstream pressure, the velocity profile at the sensor is the primary variable. The high pressure coefficient is affected by the ratio of the velocity pressure at the front of the cylinder and the average pipe velocity pressure. If the velocity profile is known, the value of this signal component can be determined.

For the downstream pressure component, the cylinder base pressure is measured. The pipe velocity profile has less of a direct effect on the low pressure coefficient because the separation of the fluid velocity stream from the cylinder creates an alternating vortex which sheds from the cylinder as a sheet, while creating a wake or stagnated area at the rear of the cylinder. Because of this stagnated area, the pressure behind the cylinder tends to be the same along the entire length. Also, because the disclosed primary elements provide a consistent cylinder shape across the entire pipe diameter, the vortex shedding is consistent and so the base pressure also remains consistent.

For a flow meter, the flow coefficient defines the relationship the meter design has to the Bernoulli energy equation, and also defines the operational characteristic of the flow meter. For comparison purposes, the flow coefficient for the Annubar® flow sensor is defined as:

$$K = \frac{1}{\sqrt{\alpha(C_{ph} + C_{pl})}}$$

Where:
K is the flow coefficient
α is the fluid kinetic energy coefficient, which is nearly a constant 1.05 for turbulent fluid flow
$C_{ph}$ is the high pressure coefficient, or the ratio of the front sensor pressure to the average velocity pressure
$C_{pl}$ is the low pressure coefficient, or the ratio of the rear or base pressure to the average velocity pressure The pressure coefficients relate the flow over the cylinder to the pressure generated and provide advanced understanding of the device before its use as a flow meter. The key to good performance in an APT primary element is a stable, repeatable, and predictable flow coefficient. The first two characteristics, stability and repeatability, ensure accurate and reliable performance. This is only assured by understanding the nature of the contribution of the sensor cylinder shape on the pressures generated and providing a design that has pressure coefficients that are linear over the flow rate range of interest. The last characteristic, predictability of the flow coefficient, allows manufacturers to apply the technology to applications geometrically different than those in which test data have been collected.

The stability and repeatability of a primary element flow coefficient is related to the shape of the primary element. In an exemplary embodiment, the disclosed APT primary element 120 uses the same rolled shape as an Annubar® primary element, and therefore it is not surprising that the flow tests provided results that were stable across a wide Reynolds number range. In flow tests, the resulting test data clearly showed Reynolds number independence expected in a good averaging pitot tube measurement. Further, flow coefficient consistency was found over repeated tests in similar line sizes, demonstrating the repeatability of the disclosed APT primary element.

Flow coefficients are empirically determined for all primary elements. Averaging pitot tubes are generally not tested in every conceivable line size. Instead, a relationship is identified between the flow coefficient and the proportion of area of the averaging pitot tube that is in the pipe to the area of the pipe. Thus, the technology can be applied to pipes with diameters that are different than those in which the primary element was tested. This relationship is generally called K vs blockage and is established by curve fitting an equation to data collected from primary elements installed in pipes with a range of diameters. Analysis of the disclosed APT primary element testing against the K vs blockage relationship used to determine flow coefficients for the exemplary Annubar® primary elements demonstrates an error in the 4" pipe was close to zero, as the slot or slots of the primary element span the entire pipe. The error is also relatively small for the 6" and 8" pipe sizes where the slot or slots do not span the entire pipe.

Analysis of the K vs Blockage relationship shows that data collected fell within 1% of a linear curve fit, strongly indicating flow coefficient predictability in pipe inner diameters (IDs) outside the scope of testing.

For a typical developed or symmetrical pipe velocity profile, sampling the velocity to get a good estimate of the flow rate does not require measuring the entire profile. It is possible to determine this analytically by utilizing earlier work done by fluids researchers to reproduce the velocity gradient in a pipe modeled in the form of equations that give the velocity at any point. One accepted and accurate velocity model is the PAI velocity equation:

$$\frac{V_P}{V_{max}} = \left(1 - \frac{(s-n)}{(n-1)}\right) \times \left(\frac{r}{r_p}\right)^2 + \frac{(1-s)}{(n-1)} \times \left(\frac{r}{r_p}\right)^{2n}$$

Where:

$$s = \frac{f \times Re_D}{32 + 46.08\sqrt{f}}$$

$$n = \frac{2 - f Re_D / 32}{1.44\sqrt{f} - 1}$$

Vp is the point velocity
Vmax is the maximum velocity
f is the pipe friction factor
$Re_D$ is the pipe Reynolds number
r is the radius at the point velocity
$r_p$ is the pipe radius This equation can be used to determine the effects on the upstream or velocity pressure component of the Annubar® sensor. Analysis of the velocity profile as calculated by the PAI equation was performed for a range of average water velocities from 2 to 30 ft/s in three nominal pipe sizes: 4", 6", and 8. Analysis showed that for a developed velocity profile, the disclosed variable line size APT primary element velocity sampling method provides remarkably good results. Due in part to a hole and/or slot pattern selected for use in pipes of a range of diameters, the application of the disclosed variable line size APT primary elements can in some embodiments be limited to installations where the flow field at the measurement location is developed or close enough to a developed flow where the swirl and asymmetry components do not adversely affect the measurement signal.

Pursuant to exemplary embodiments, a mounting assembly 112 for mounting an APT primary element 120 to a process pipe 108 such that a length of the APT primary element extending into the process pipe is adjustable to accommodate different sized process pipe diameters is disclosed. The APT primary element has neck section 304 and a sensor section 303. For example, the neck section 304 can be a cylindrical or round shaped neck section, while the sensor section can be a T-shaped sensor section. A mounting weld coupling 305 is coupled to the process pipe over an opening 330 in the process pipe and has the APT primary element extending therethrough into the process pipe. An extension pipe nipple 310 has threads on first and second ends and the APT primary element extends therethrough such that a transition 302 between the neck section and the sensor section of the APT primary element is positioned inside the extension pipe nipple. A first end 307 of the extension pipe nipple is threaded into the mounting weld coupling 305.

A union component 315 has first and second ends and has the neck section of the APT primary element extending therethrough. The second end of the extension pipe nipple is threaded into the first end of the union component. A ferrule 320 surrounds the neck section of the APT primary element. A cap 325 threads onto the second end of the union component to compress the ferrule within the union component and to create a ferrule process seal around the neck section of the APT primary element.

In some embodiments, the extension pipe nipple has a length such that the transition 302 between the neck section 304 and the sensor section 303 of the APT primary element is positioned within the extension pipe nipple, and thereby within the process seal, over a range of APT primary element positions allowing the sensor section of the APT primary to be inserted into a range of different sized process pipes having different diameters.

In some embodiments, the mounting assembly further comprises a retainer ring 340 fixedly coupled to the neck section of the APT primary element. In some embodiments, the union component includes a tapered internal surface which lacks clearance for the retainer ring to pass therethrough such that the APT primary element cannot be ejected in the event of a ferrule process seal failure.

In some embodiments, the mounting weld coupling 305 is welded to the process pipe over the opening in the process pipe.

In some embodiments, a process variable monitoring system for measuring a process variable indicative of a flow rate of a process fluid in a process pipe is disclosed to include a process variable transmitter, a pressure sensor in the process variable transmitter, an APT primary element having a neck section, a sensor section, and a transition between the neck section and the sensor section. The APT primary element extends into the process pipe and couples process pressures of the process fluid to the pressure sensor such that the pressure sensor provides as an output pressure measurements indicative of the flow rate of process fluid in the process pipe. A mounting assembly as described mounts the APT primary element on the process pipe.

In some exemplary embodiments, a storage memory device of the process variable transmitter is configured to store flow coefficient versus blockage relationship data such that at least one of measurement circuitry and a controller of the transmitter are configurable with flow coefficients for different diameter process pipes.

Although the present invention has been described with reference to preferred embodiments, workers skilled in the art will recognize that changes may be made in form and detail without departing from the spirit and scope of the invention. For example, in some exemplary embodiments, the hole and/or slot pattern of the APT primary element can be established based upon the smallest diameter pipe with which the APT primary element and mounting assembly will be used. This hole and/or slot pattern can then be used in larger diameter pipes as well. In some exemplary embodiments, any hole and/or slot pattern of the APT primary element can be established that is smaller than, or extends less of a distance on, the distal end of the APT primary element than the diameter of the smallest diameter pipe with which the APT primary element will be used. For example, a hole and/or slot pattern on the APT primary element which extends only two thirds of the way across the smallest applicable pipe can be established and then used on a range of larger pipe sizes as well.

What is claimed is:

1. A process variable monitoring system for measuring a process variable indicative of a flow rate of a process fluid in a range of different sized process pipes, the system comprising:
a process variable transmitter;
a pressure sensor in the process variable transmitter;
an averaging pitot tube (APT) primary element having a distal region including one or more slots, the APT primary element being extendable into the process pipe to couple process pressures of the process fluid to the pressure sensor such that the pressure sensor provides as an output pressure measurement indicative of the flow rate of process fluid in the process pipe, wherein the distal region including the one or more slots is sized such that for larger diameter process pipes the one or more slots span a smaller percentage of the pipe diameter than for smaller diameter pipes; and
a mounting assembly configured to mount the APT primary element to the process pipe and provide a process seal such that a length of the APT primary element extending into the process pipe is adjustable for different sized process pipes, the mounting assembly comprising a ferrule surrounding the APT primary element and a compression fitting which compresses the ferrule to create a ferrule process seal.

2. The process variable monitoring system of claim 1, wherein the APT primary element comprises a neck section, a sensor section, and a transition between the neck section and the sensor section, and wherein the transition between the neck section and the sensor section is adjustably positioned within the mounting assembly.

3. The process variable monitoring system of claim 2, wherein the mounting assembly further comprises an extension pipe in which the transition between the neck section and the sensor section is adjustably positioned.

4. The process variable monitoring system of claim 3, wherein the mounting assembly further comprises:
a mounting weld coupling welded to the process pipe over an opening in the process pipe and having the APT primary element extending therethrough into the process pipe, the extension pipe having threads on first and second ends, wherein a first end of the extension pipe is threaded into the mounting weld coupling such that the APT primary element extends therethrough;
a union component having first and second ends and having the neck section of the APT primary element extending therethrough, wherein the second end of the extension pipe is threaded into the first end of the union component; and
wherein the ferrule surrounds the neck section of the APT primary element.

5. The process variable monitoring system of claim 4, wherein the compression fitting of the mounting assembly further comprises a cap which threads onto the second end of the union component to compress the ferrule within the union component to create the ferrule process seal around the neck section of the APT primary element.

6. A mounting assembly for mounting an averaging pitot tube (APT) primary element to a process pipe such that a length of the APT primary element extending into the process pipe is adjustable to accommodate different sized process pipe diameters, the APT primary element having a neck section and a sensor section, the mounting assembly comprising:
a mounting weld coupling coupled to the process pipe over an opening in the process pipe and having the APT primary element extending therethrough into the process pipe;
an extension pipe nipple having threads on first and second ends and the APT primary element extending therethrough such that a transition between the neck section and the sensor section of the APT primary element is positioned inside the extension pipe nipple, wherein a first end of the extension pipe nipple is threaded into the mounting weld coupling;

a union component having first and second ends and having the neck section of the APT primary element extending therethrough, wherein the second end of the extension pipe nipple is threaded into the first end of the union component;

a ferrule surrounding the neck section of the APT primary element; and a cap which threads onto the second end of the union to compress the ferrule within the union component and to create a ferrule process seal around the neck section of the APT primary element.

7. The mounting assembly of claim 6, wherein the extension pipe nipple has a length such that the transition between the neck section and the sensor section of the APT primary element is positioned within the extension pipe nipple, and thereby within the process seal, over a range of APT primary element positions allowing the sensor section of the APT primary element to be inserted into a range of different sized process pipes having different diameters.

8. The mounting assembly of claim 6, and further comprising a retainer ring fixedly coupled to the neck section of the APT primary element.

9. The mounting assembly of claim 8, wherein the retainer ring is welded to the neck section of the APT primary element.

10. The mounting assembly of claim 8, wherein the union component includes a tapered internal surface which lacks clearance for the retainer ring to pass therethrough such that the APT primary element cannot be ejected in the event of a ferrule process seal failure.

11. The mounting assembly of claim 6, wherein the mounting weld coupling is welded to the process pipe over the opening in the process pipe.

12. A process variable monitoring system for measuring a process variable indicative of a flow rate of a process fluid in a process pipe, the system comprising:

a process variable transmitter;

a pressure sensor in the process variable transmitter;

an averaging pitot tube (APT) primary element having a neck section, a sensor section, and a transition between the neck section and the sensor section, the APT primary element extending into the process pipe and coupling process pressures of the process fluid to the pressure sensor such that the pressure sensor provides as an output pressure measurement indicative of the flow rate of process fluid in the process pipe, wherein a distal region of the sensor section includes one or more slots and is sized such that for larger diameter process pipes the one or more slots span a smaller percentage of the pipe diameter than for smaller diameter pipes;

a mounting weld coupling welded to the process pipe over an opening in the process pipe and having the APT primary element extending therethrough into the process pipe;

an extension pipe nipple having threads on first and second ends and the APT primary element extending therethrough such that the transition between the neck section and the sensor section of the APT primary element is positioned inside the extension pipe nipple, wherein a first end of the extension pipe nipple is threaded into the mounting weld coupling;

a union component having first and second ends and having the neck section of the APT primary element extending therethrough, wherein the second end of the extension pipe nipple is threaded into the first end of the union component;

a ferrule surrounding the neck section of the APT primary element; and a cap which threads onto the second end of the union component to compress the ferrule within the union and to create a ferrule process seal around the neck section of the APT primary element.

13. The system of claim 12, wherein the extension pipe nipple has a length such that the transition between the neck section and the sensor section of the APT primary element is positioned within the extension pipe nipple, and thereby within the process seal, over a range of APT primary element positions allowing the sensor section of the APT primary to be inserted into a range of different sized process pipes having different diameters.

14. The system of claim 13, and further comprising a retainer ring welded to the neck section of the APT primary element.

15. The system of claim 14, wherein the union component includes a tapered internal surface which lacks clearance for the retainer ring to pass therethrough such that the APT primary element cannot be ejected in the event of a ferrule process seal failure.

16. The system of claim 13, and further comprising communication circuitry, in the process variable transmitter, configured to couple to and communicate over a process control loop.

17. The system of claim 16, wherein the communication circuitry is configured to communicate wirelessly.

18. The system of claim 16, and further comprising measurement circuitry coupled to the pressure sensor and configured to provide a sensor output.

19. The system of claim 18, and further comprising a controller coupled to the measurement circuitry and to the communication circuitry.

20. The system of claim 19, further comprising a storage memory device configured to store flow coefficient versus blockage relationship data such that at least one of the measurement circuitry and the controller are configurable with flow coefficients for different diameter process pipes.

* * * * *

UNITED STATES PATENT AND TRADEMARK OFFICE
CERTIFICATE OF CORRECTION

PATENT NO. : 9,551,601 B2
APPLICATION NO. : 14/585423
DATED : January 24, 2017
INVENTOR(S) : Gregory Robert Strom et al.

Page 1 of 1

It is certified that error appears in the above-identified patent and that said Letters Patent is hereby corrected as shown below:

In the Claims

Column 11, Line 23, Claim 8 delete "and"

Column 12, Line 43, Claim 18 delete "and"

Column 12, Line 46, Claim 19 delete "and"

Signed and Sealed this
Sixth Day of February, 2018

Joseph Matal
*Performing the Functions and Duties of the*
*Under Secretary of Commerce for Intellectual Property and*
*Director of the United States Patent and Trademark Office*